United States Patent [19]
Betts et al.

[11] Patent Number: 5,444,712
[45] Date of Patent: Aug. 22, 1995

[54] COMMUNICATION MODE IDENTIFICATION TECHNIQUE

[75] Inventors: William L. Betts, St. Petersburg, Fla.; Eran Cohen, Ocean, N.J.; Joseph A. Crupi, Safety Harbor; Cletus L. Gardenhour, St. Petersburgh, both of Fla.; Andrew T. Weitzner, Belmar; Jean-Jacques Werner, Holmdel, both of N.J.

[73] Assignee: AT&T Corp., Murray Hill, N.J.

[21] Appl. No.: 113,113

[22] Filed: Aug. 30, 1993

[51] Int. Cl.⁶ .......................... H04L 27/34; H04J 3/12
[52] U.S. Cl. .................................... 370/110.1; 375/261
[58] Field of Search ............... 370/110.1, 24, 29, 94.1, 370/94.2; 375/39, 13, 106

[56] References Cited

U.S. PATENT DOCUMENTS

| | | | |
|---|---|---|---|
| 3,955,141 | 5/1976 | Lyon et al. | 325/38 A |
| 4,891,806 | 1/1990 | Farias et al. | 375/39 |
| 5,022,053 | 6/1991 | Chung et al. | 375/39 |
| 5,036,526 | 7/1991 | McNichol et al. | 375/39 |
| 5,105,443 | 4/1992 | Betts et al. | 375/39 |
| 5,233,629 | 8/1993 | Paik et al. | 375/39 |

OTHER PUBLICATIONS

U.S. Application Ser. No. 07/620868, filed on Nov. 30, 1990 (J. Werner 17).

U.S. Application Serial No. 07/891500, filed on May 29, 1992. (Huang 2-19).

U.S. Application Serial No. 07/830,036, filed on Jan. 31, 1992 (M. Sobasra 1-18).

*Primary Examiner*—Wellington Chin
*Attorney, Agent, or Firm*—Otho B. Ross; David R. Padnes

[57] ABSTRACT

A technique for use in communications systems utilizing busy and idle modes. In the busy mode, symbols representative of data are transmitted to system end users. In the idle mode, during which no data is communicated to end users, idle mode symbols are transmitted. Such idle mode symbols are not used to represent data and are only transmitted during the idle mode. Advantageously, such idle mode symbols maintain adaptive apparatus, such as AGC circuits, NEXT cancellers and equalizers, in their properly converged state. In the disclosed embodiment, the idle mode symbols are the innermost symbols in a signal constellation and transition from the idle to busy mode is represented by the transmission of a predetermined number of outermost symbols in the signal constellation. Use of such symbols for idle-to-busy mode transitions advantageously provides ready detection of such transitions. In addition, use of the innermost symbols for the idle mode reduces spectral emission and crosstalk.

18 Claims, 5 Drawing Sheets

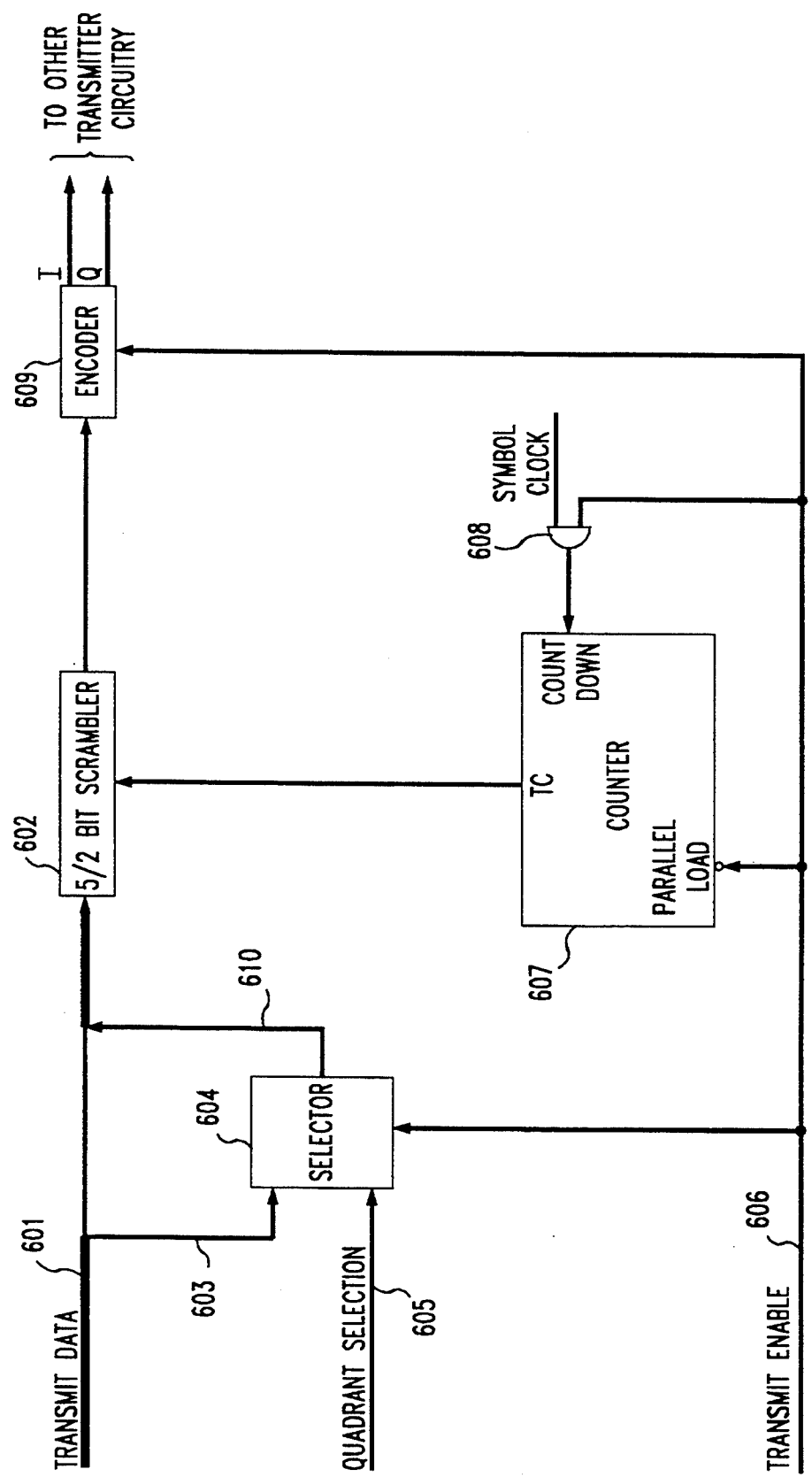

COMMUNICATION MODE IDENTIFICATION TECHNIQUE

TECHNICAL FIELD

The present invention relates to communications systems and, more particularly, to such systems which utilize more than one operating mode.

BACKGROUND OF THE INVENTION

A variety of data communications systems exist for coupling data between end users. Such systems utilize a number of different topologies and protocols. One commonly used arrangement is the Ethernet system in which end users are all connected to one another via a coaxial cable. Deployment of this system has waned due to the need to install coaxial cable. On the other hand, systems which utilize twisted pair wires, such as the 10BaseT system, have experienced widespread growth. In any of the foregoing systems, there are two communications modes. In the busy mode, data is coupled between the end users and, in the idle mode, end-user data is not coupled.

Most recently, a higher-speed version of the 10BaseT system, known as 100 Mbps Fast Ethernet, is being proposed which increases the nominal data rate tenfold. To lessen implementation costs, this proposed system is compatible with the half-duplex Ethernet and 10BaseT protocol. However, the higher speed in this proposed system necessitates the use of distortion compensation devices, such as automatic gain control (AGC) circuits, equalizers and NEXT (near-end crosstalk) cancellers.

Equalizers and NEXT cancellers have long been used for distortion compensation and implemented in either of two classes. In the first, the amount of distortion compensation provided is fixed, while in the second, the distortion compensation provided varies to match the time-varying distortion introduced in the communications channel. Due to the varying nature of the distortion compensation provided, this second class of devices is referred to as being "adaptive".

Adaptive NEXT cancellers and equalizers adjust the amount of distortion compensation required. This adjustment or adaptation process is commonly referred to as convergence and requires a finite time interval. During this time interval, the amount of compensation provided is not optimum and, as a result, there is a greater likelihood of data errors. While data communications could be inhibited during such adaptation intervals, this procedure is inefficient and must be repeated during each idle-to-busy mode transition.

It would therefore be desirable if a technique could be developed for communications systems having busy and idle modes which eliminates the need to converge adaptive distortion compensation devices to their optimum settings after each idle mode.

SUMMARY OF THE INVENTION

In accordance with the present invention, symbols representative of data are transmitted to end users in the busy mode. In the idle mode, during which no data is communicated to end users, idle mode symbols are transmitted which maintain adaptive apparatus, such as NEXT cancellers and equalizers, in their properly converged state. Such idle mode symbols are not used to represent data and are only transmitted during the idle mode.

In the disclosed embodiment, the idle mode symbols are the innermost symbols in a signal constellation. To designate a transition from the idle to the busy mode, one or more outermost symbols in the constellation are transmitted. This use of innermost and outermost symbols advantageously provides ready detection of such idle-to-busy mode transitions and the use of the innermost symbols during the idle mode reduces spectral emission and crosstalk during such time intervals.

BRIEF DESCRIPTION OF THE DRAWINGS

FIG. 6 is a block-schematic diagram of a portion of the transmit portion of each transceiver in accordance with the present invention.

DETAILED DESCRIPTION

Figure 1:
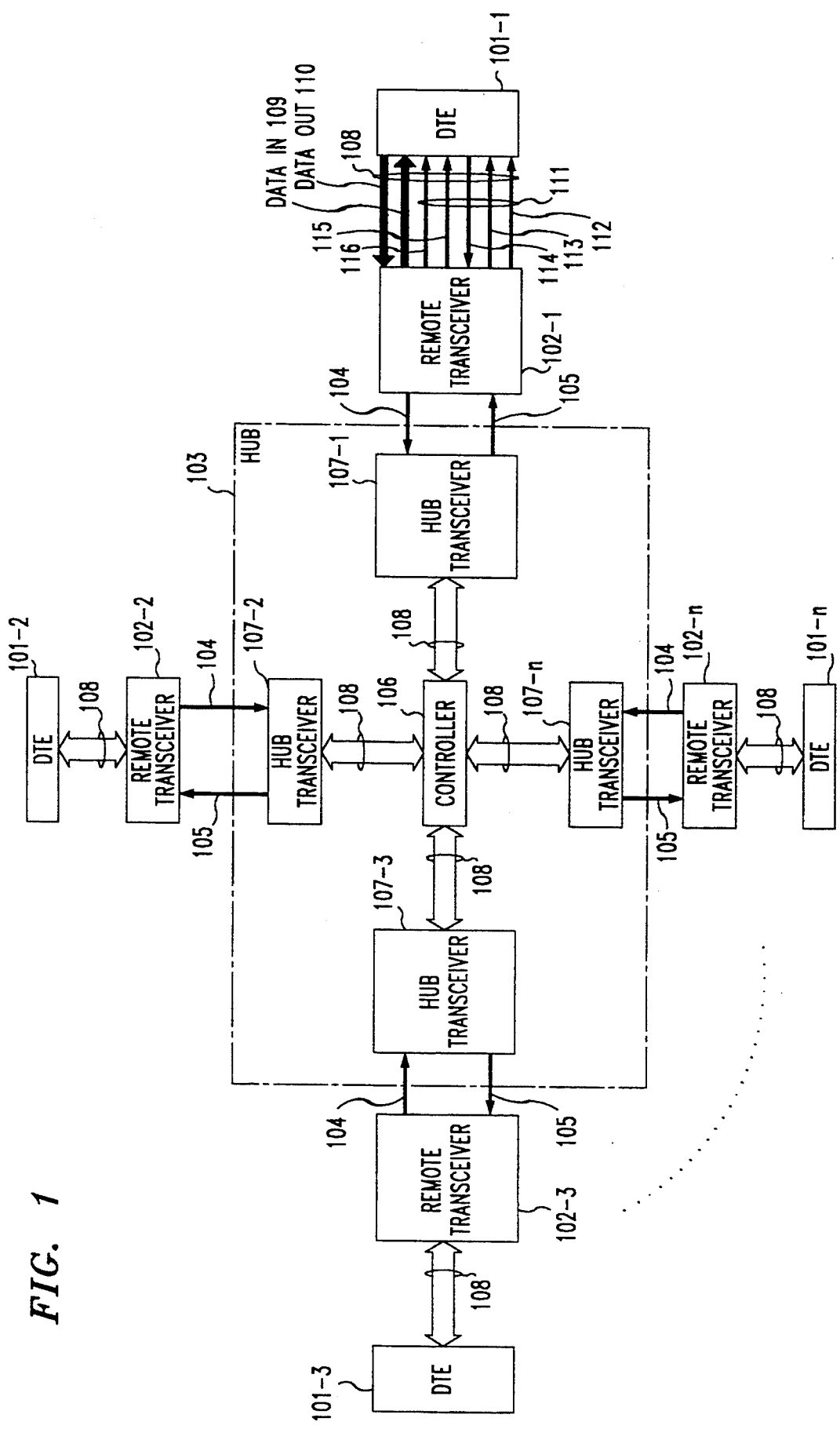
FIG. 1 is a block-schematic diagram of an illustrative communication system to which the present invention pertains.

FIG. 1 shows an illustrative communications system 100 to which the present invention pertains. System 100 is arranged in a star topology and can be implemented in a number of formats. One format is commonly referred to as 10BaseT and a proposed successor to this format is referred to as 100 Mbps Fast Ethernet. In both of these cited formats, the numbers 10 and 100 respectively designate the data speeds of 10 megabits per second and 100 megabits per second on twisted pair wiring. System 100 provides communications capabilities among a plurality of digital terminal equipment (DTEs) designated as 101-1, 101-2, 1013 3 . . . 101-n. Each of these DTEs is respectively connected to an associated remote transceiver 102-1, 102-2, 102-3 . . . 102-n. Each of these remote transceivers is connected to hub 103 via a corresponding "toward the hub" link 104 and "from the hub" link 105. Hub 103 includes a controller 106 which communicates with a plurality of hub transceivers 107-1, 107-2, . . . 107-n and each such transceiver is connected to a different hub transceiver. The connection between the DTEs and their associated remote transceivers and between the controller and its hub transceivers is provided by buses 108. Each of these buses includes data-in and data-out leads 109 and 110 and a plurality of control leads 111. This plurality includes leads 112, 113, 114, 115 and 116 which respectively couple a carder sense, receive enable, transmit enable, collision detection and receive clock signals. Of course, other leads can be included in these buses to couple other control signals, such as a transmit clock signal.

In the illustrative system, the system continuously transmits signals so as to maintain certain adaptive circuits, such as AGC circuits, equalizers and NEXT cancellers, in their converged or optimum operating state. Two communications modes are utilized. In the busy mode, a data packet is transmitted which originated from a DTE and the adaptive circuitry utilizes these packets for adaptation. In the idle mode, another signal, hereinafter referred to as an idle signal, is transmitted.

This idle signal does not originate from and is not destined for a DTE. Instead, the idle signal is used for circuit adaptation. In addition, while the toward-the-hub and from-the-hub links extending between a pair of hub and remote transceivers constitute a full-duplex communications path, in the disclosed embodiment, the system operates in a manner which emulates half-duplex operation. That is, in the absence of collisions, i.e., the transmission of data signals in opposite directions at the same time, while a toward-the-hub link between a pair of remote and hub transceivers is busy communicating data signals to the hub, the from-the-hub link between this pair of transceivers is placed in the idle mode.

In the data mode, a data packet is transmitted from any one DTE and broadcast to all of the other DTEs. Typically, each data signal is destined for a particular DTE and this destination is indicated by information in the transmitted data packet. Each DTE determines whether a data packet received is destined for itself by examining a portion of the received data packet. To emulate half-duplex communications, the carrier sense lead in each bus 108 couples a two-state logic signal which indicates whether the receive portion of a remote or hub transceiver is receiving non-idle symbols. If so, the state of the carrier sense signal inhibits a DTE or the controller from coupling a data packet to it. Similarly, if the receive portion of a transceiver is receiving idle symbols, the state of the carrier sense signal enables transmission of a data packet to that transceiver. The receive enable signal in bus 108 informs the controller or a DTE that a transceiver is about to couple data to it. In the opposite direction, the transmit enable signal indicates to a hub or remote transceiver that a data packet is being coupled to it from the controller or a DTE, respectively. In the disclosed embodiment, wherein full-duplex links emulate half-duplex operation, the logic state of the transmitted enable signal indicates that data is ready to be transmitted and that an idle condition of the data in bus has been detected for a predetermined time. The detection of the idle condition for a predetermined time interval assures that the data in bus is indeed in an idle condition and maintains a predetermined time interval or interpacket gap between successive data packets. The collision detect signal, which is a logical "AND" of the transmit enable and carrier sense signals, indicates that a collision has occurred in the system between data packets. While the carrier sense signal precludes the probability of collisions, collisions still occur due to the existence of signal propagation delay or a time interval between transmission of a data signal from one DTE through its associated remote transceiver and receipt of this data signal by the other remote transceivers. The existence of a collision causes retransmission of the colliding or interfering data signals at a later time by their transmitting DTEs. Finally, the receive clock signal is coupled on bus 108 to each DTE and the controller and is used for strobing the signals received by such equipment.

While system 100 is shown as having a "star" topology, the system can be expanded to include several interconnected stars. Expansion of the illustrated system can be provided in several ways including the direct connection of one controller to another via an appropriate link or by replacing any DTE with a controller. In addition, while in the disclosed embodiment, full-duplex links emulate half-duplex operation, the invention is also applicable to a system wherein the full-duplex capabilities of these links are utilized.

Figure 2:
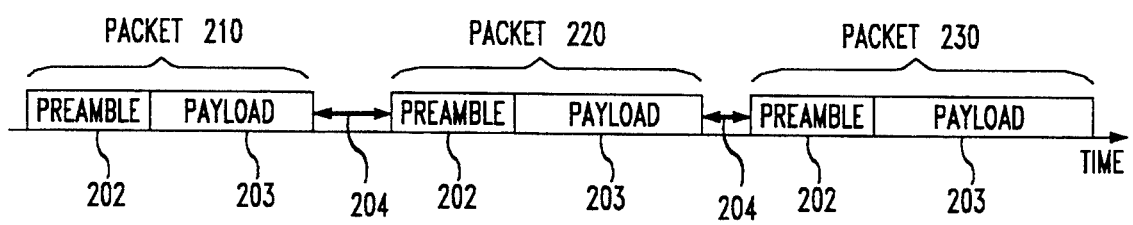
FIG. 2 is a graphical representation of an illustrative signal format for use in the system of FIG. 1.

Refer now to FIG. 2 which shows an illustrative data signal format 200 for use in system 100. The data signals transmitted in system 100 are each packaged into packets wherein each packet has a preamble and a payload portion. Three such packets designated as 210, 220 and 230 are shown. While the packet size could be fixed, as shown in FIG. 2, the packet size can be variable. The preamble portion 202 of each packet indicates the beginning of a packet and, accordingly, a transition from the idle to the busy mode. The payload portion 203 includes the information to be coupled to a DTE and also includes an identification of that DTE for which the information is intended. An interpacket idle period, designated as 204, exists between successive packets and this period is variable. It is during each of these idle time periods, that the idle signal is transmitted.

In the disclosed embodiment, the signals which are transmitted by each remote and hub transceiver, be they representative of data packets or the idle mode, are symbols in a modulation format wherein each symbol has an in-phase (I) and quadrature (Q) symbol component. Each of these symbol components is representative of a plurality of bits. A variety of modulation formats, including those referred to as quadrature amplitude modulation (QAM), phase shift keying (PSK) and carrierless amplitude/phase modulation. In any event, the ensemble of symbols utilized may be represented in a Cartesian or polar coordinate plot referred to as a signal constellation.

Figure 3:
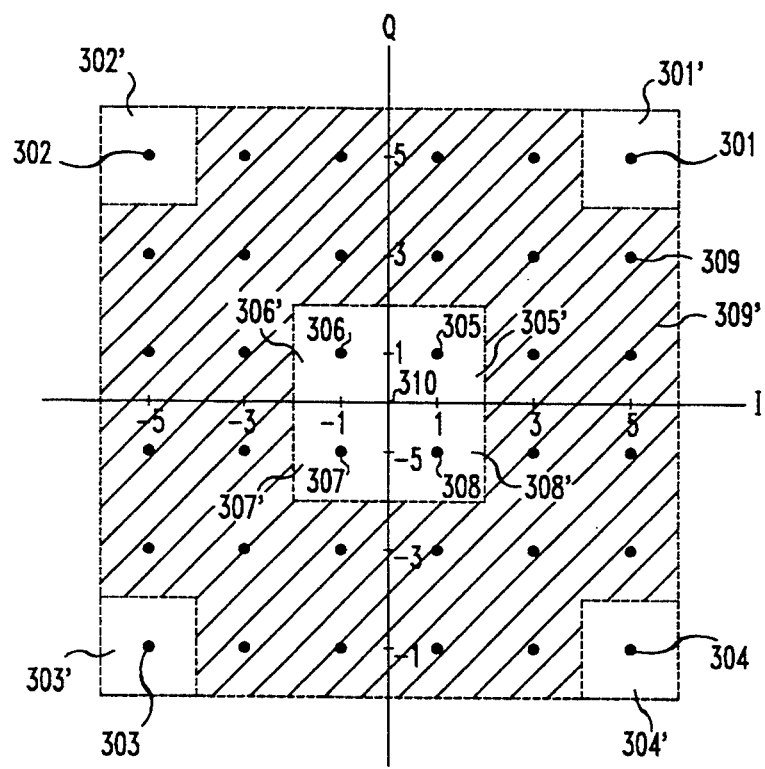
FIG. 3 is a representation of an illustrative signal constellation for use in accordance with the present invention.

FIG. 3 shows an illustrative signal constellation 300 including 36 symbols whose permissible I and Q symbol component values are $-5$, $-3$, $-1$, $+1$, $+3$, and $+5$. Recognizing that, due to the presence of noise and distortion, each received symbol differs from its transmitted counterpart, the recovery of each transmitted symbol from its received counterpart involves a quantization of the received I and Q symbol component values to the closest one of the permissible I and Q symbol component values. Referring to FIG. 3, this quantization process results in any received symbol lying in a particular area of the signal constellation being mapped into one of the 36 symbols in FIG. 3. For example, any received symbol lying into the regions 301', 302', 303' and 304' are respectively mapped into symbols 301, 302, 303 and 304.

In accordance with the present invention, a subset of the symbols in constellation 300 is reserved for representing the idle mode. In particular, constellation 300 includes four "outermost" symbols 301, 302, 303 and 304, four "innermost" symbols 305, 306, 307 and 308, and twenty-eight other symbols designated as 309. In accordance with the disclosed embodiment, the four innermost symbols 305-308 are transmitted during the idle mode and are not used to represent data packets. Advantageously, the four outermost symbols 301 through 304 are used to indicate a transition from the idle to the busy mode and may be followed by the innermost symbols 305-308 and/or certain ones of the symbols 309 during the preamble portion of each packet. Therefore, the preamble portion may include one or more outermost symbols, or such symbols in combination with one or more innermost symbols, or a combination of outermost, innermost and symbols 309. In any event, the arrangement of symbols in the preamble portion is a priori known to the receiver. Use of the innermost symbols for the idle mode coupled with the use of the outermost symbols to designate a transition from the idle to the busy mode is particularly desirable as it provides a reliable mechanism for determining the communications mode even in the presence of noise and distortion.

During the payload portion of each data packet, the thirty-two other symbols 309 along with the outermost symbols 301–304 are used to represent the information in the payload portion. It should be recognized that the four outermost symbols serve a dual function—representing data if they appear during the payload portion of a data packet or indicating a idle-to-busy mode transition if they appear during the preamble portion of a data packet. On the other hand, the four innermost symbols are never used to represent data in the payload portion of a data packet and are only utilized during the idle mode.

Recognizing that, due to the presence of noise and distortion, each received symbol differs from its transmitted counterpart, the recovery of each transmitted symbol from its received counterpart involves a quantization of the received I and Q symbol component values to the closest one of the transmitted I and Q symbol values. Referring to FIG. 3, this quantization process results in any received symbol lying in an area around each symbol being mapped to that symbol. For example, any received symbol lying into the regions 301', 302', 303' and 304' is respectively mapped into symbols 301, 302, 303 and 304. Applying this concept of regions, the portion of the constellation used to represent information in the payload portion of each data packet includes an aggregation of regions 309' (shown crosshatched and being a composite of the areas surrounding each of the 28 symbols 309) and regions 301' through 304'. It should be noted that regions 305', 306', 307' and 308' are excluded from this aggregation. The four innermost symbols can therefore be said to lie in a region, i.e., 305'–309', which is "outside" of the region, i.e., 309' and 301'–304', encompassing the symbols used to represent the payload information in each data packet. Moreover, the region associated with the four innermost symbols is surrounded by the region associated with the symbols used to represent information in the payload portion of each data packet.

Figure 4:
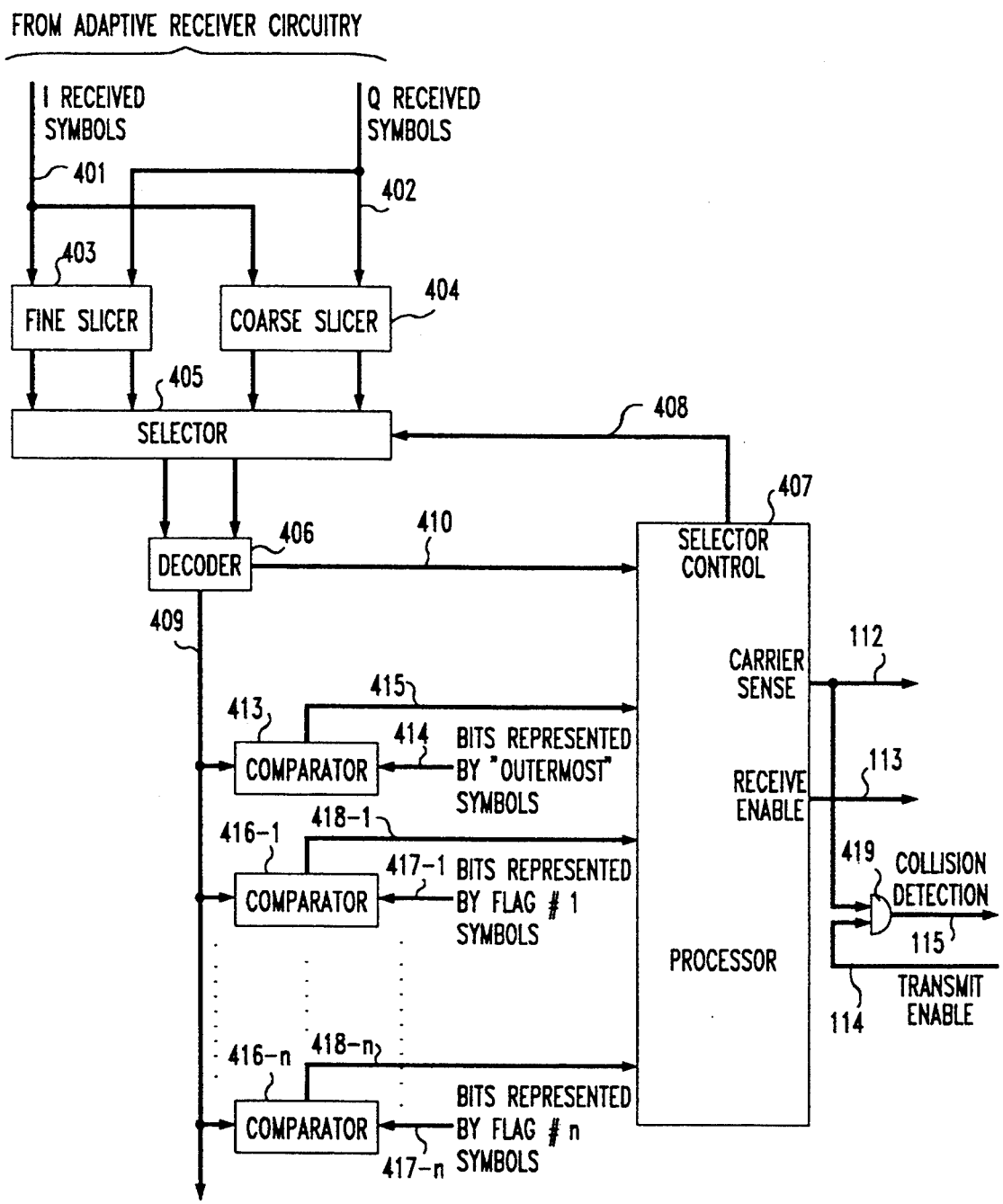
FIG. 4 is a block-schematic diagram of a portion of each of the mode transceivers 102-1-102-n in FIG. 1.

Refer now to FIG. 4 which shows the receiver portion 400 of each hub and remote transceiver of FIG. 1 which incorporates the present invention. The received I and Q symbols are recovered and passed through adaptive NEXT cancellation and equalization apparatus (not shown) before appearing on leads 401 and 402. "Fine" slicer 403 and "coarse" slicer 404 each quantize the vector sum of the I and Q received symbols into one of a plurality of outputs by comparing the received symbols to a set of reference levels. The adjectives "fine" and "coarse" refer to the separation of these reference levels from one another. The fine slicer, in well-known fashion, utilizes a set of reference levels which quantize the received symbols into the closest one of the 36 symbols in constellation 300. Coarse slicer 404, on the other hand, simply makes a determination if the received I and Q symbol values are closest to any of the innermost symbols 305–308 or one of the outermost symbols. In other words, the coarse slicer determines whether or not an idle state exists in a particular communications link. Each slicer provides a pair of quantized or mapped outputs which is coupled to decoder 406 via selector 405. The selector, under the control of a mode signal on lead 408, couples either the outputs of fine slicer 403 or coarse slicer 404 to decoder 406.

Within the decoder, the quantized I and Q symbol components provided by either slicer are transformed into their corresponding bit values and outputted onto bus 409. In addition, since each of the idle symbols, unlike each of the other symbols is not representative of a different 5-bit pattern, the receipt of an idle symbol does not provide an output of bus 409. Instead, the detection of an idle symbol provides a control symbol on lead 410 which is connected to processor 407. The bits provided to bus 409 are the payload portion of each data packet. Preceding this portion are the bits representative of the idle-to-busy transition. To detect this transition, the bits on bus 409 are examined. This examination process involves the coupling of bits on bus 409 to different comparators. Each such comparator is supplied with one or more associated reference signals. As shown in FIG. 4, comparator 413 compares the bits on bus 409 to those associated with each of the four outermost symbols in constellation 300. These associated bits are supplied to comparator 410 as a reference signal via bus 414. An indication of the detection of the bits associated with any outermost symbol is also coupled to processor 407 via lead 415.

As previously described, in the disclosed embodiment, the transition from idle to busy mode is indicated by the transmission of one or more outermost symbols. Preferably, all four outermost symbols in constellation 300 are utilized. In addition, one or more "flag" symbols are transmitted after the outermost symbols and such flag symbols provide further confirmation that a data packet will follow. In the disclosed embodiment, this data packet immediately follows the last flag symbol. A flag symbol can be any symbol in constellation 300 except for the four innermost symbols. Referring to FIG. 4, it will be assumed that n such flag symbols are transmitted after the four outermost symbols and such flag symbols are transmitted in a predetermined order. Comparators 416-1 through 416-n compare the bits on bus 409 to the bits associated with each flag symbol. These associated bits are provided to comparators 416-1 through 416-n via buses 417-1 through 417-n, respectively. When the bits on bus 409 match any of the bits associated with a flag symbol, an indication is provided to processor 407 by the corresponding one of leads 418-1 through 418-n.

Processor 407 examines the signals supplied from each of the comparators, determines the mode and controls the operation of selector 405 via lead 408. In the idle mode, when only innermost symbols are detected, selector 405 couples the output of coarse slicer 405 to the decoder. Upon detecting an outermost symbol, the output of fine slicer 403 is coupled to the decoder. Finally upon determining that the requisite pattern of outermost symbols have been transmitted along with the predetermined pattern of flag symbols, the processor outputs the appropriate state of the receive enable and carrier sense signals. AND gate 419 provides the collision detect signal by forming the logical AND of the carrier sense and transmit enable signals. The latter signal is supplied to the AND gate by the DTE or controller in FIG. 1.

Figure 5:
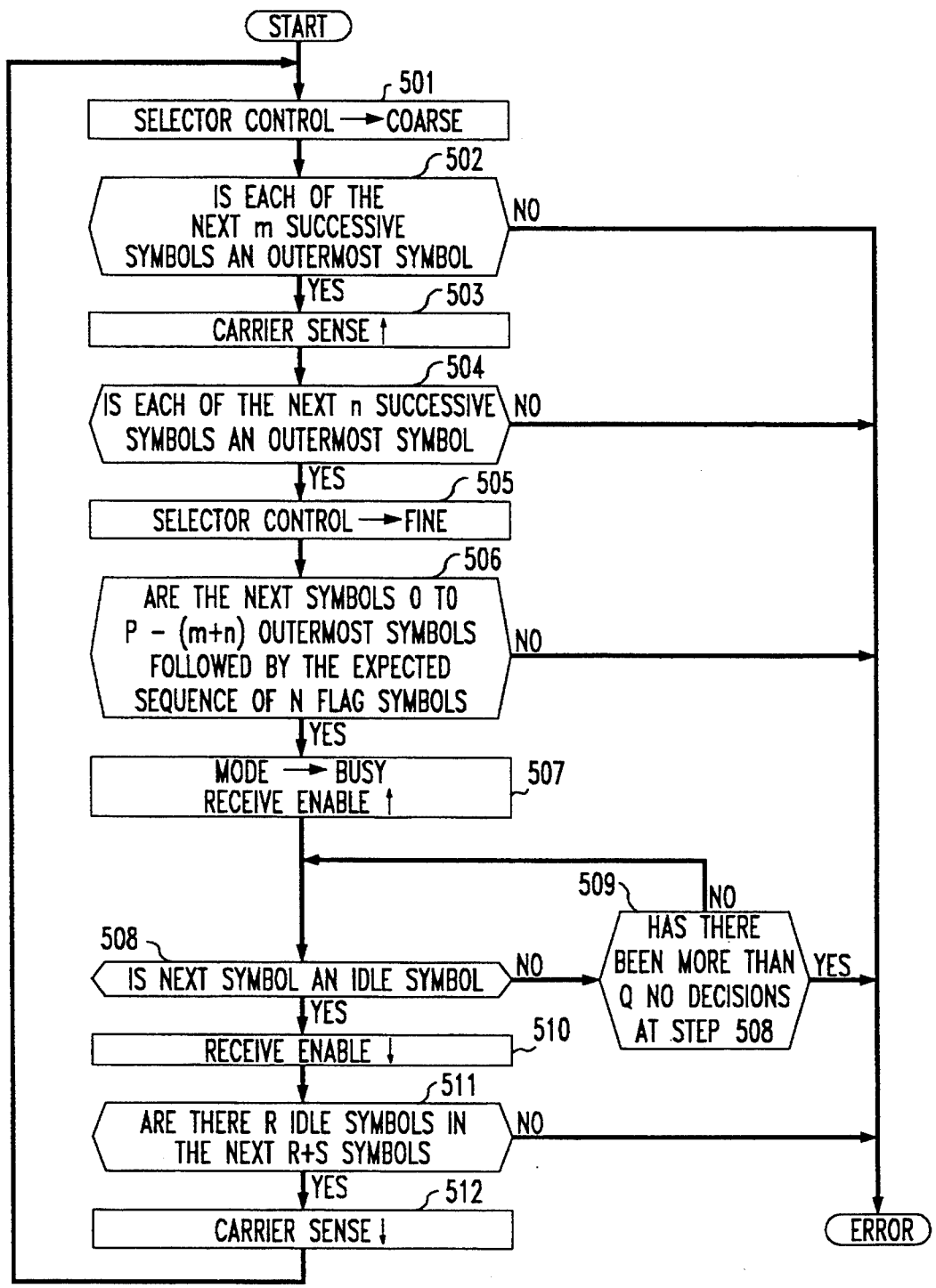
FIG. 5 is a flowchart which sets forth the sequence of operations performed by the remote transceiver controller in FIG. 4.

Refer now to FIG. 5, which shows a sequence of operations 500 carried out by processor 407 in accordance with the present invention. At step 501, the selector control signal is set to couple the outputs of coarse slicer 404 to decoder 406. For purposes of discussion, it will be assumed that some number, P, of outermost symbols have been transmitted to indicate an idle-tobusy mode transition. At step 502, m successive outputs of slicer 404, where m is a predetermined number less than P, are examined to determine if each of these outputs corresponds to one of the four outermost symbols. If so, processing proceeds to step 503 where the carrier sense signal state is set to respectively preclude transmission from its associated DTE or controller. If not, an error condition exists and processing stops.

At step 504, the next n successive symbols, where n is another predetermined number less than m, are examined to determine if each is an outermost symbol. Again, if not, an error condition exists and processing stops. If so, the sequence continues on to step 505 where selector 405 couples the output of fine slicer 403 to decoder 406. The separate examination steps 502 and 504 permit the carrier sense signal to be changed when a transition from the idle to the busy mode is suspected. However, the change from the coarse to fine slicer, the latter having a higher susceptibility to errors, is not done until we are more certain of the transition. Accordingly, it should be noted that a change to the fine slicer is done when m+n outermost symbols are detected where the sum m+n is some number close to and less than P. The reason that m+n is not equal to P is that it is recognized that improper detection or one or some small number of outermost symbols is possible. Accordingly, after step 505, if no symbols have been "lost", i.e., not detected, there may be an additional P−(m+n) outermost symbols detected. On the other hand, if P−(m+n) outermost symbols have been lost, then there are 0 remaining outermost symbols to be received. For this reason, at step 506, a decision is made as to whether there are 0 to P−(m+n) outermost symbols detected followed by the expected sequence of N flag symbols. If so, processing continues on to step 507 where the mode is set to busy and the receiver enable signal state is set to enable the receive portion of a DTE or controller.

The next symbol is retrieved at step 508 and examined to determine whether it is an idle symbol. If so, then the receive enable state is changed at step 510 to disable the operation of the receiver portion of a DTE or controller. If the symbol detected at step 508 is not an idle symbol, then processing proceeds through step 509 and returns to step 508. At step 509, the number of non-idle symbols detected at step 508 is counted. Once this number reaches some predetermined number, Q, an error condition is assumed to exist.

At step 511, the symbols after the first idle symbol are examined and R idle symbols out of R+S symbols must be detected before operations continue on to step 512 where the state of the carrier sense signal is changed to permit coupling of signals from the DTE or controller to the transmit portion of the transceiver. The allowance of R out of R+S symbols for confirming the existence of the idle mode allows the presence of some predetermined degree of errors in the detection process. From step 5 12, the sequence returns to step 501.

FIG. 6 shows the transmit portion 600 of a remote or hub transceiver which incorporates the present invention. The payload portion of each data packet and the N flag symbols are coupled via bus 601. A subset of bus leads 603 couple the qua&ant-specifying bits and these leads are routed through selector 604. In the busy mode, the quadrant-specifying bits on lead 603 are coupled through the selector to lead 610 and scrambler 602. The scrambler operates in accordance with any of a variety of well-known scrambling algorithms to scramble all of its input bits. In the busy mode, there are 5 such bits for each symbol in constellation 300 as the idle symbols do not have bit representations. Hence, each of the remaining 28 symbols in the constellation is representative of a different 5-bit pattern. The scrambled 5-bit output of scrambler 602 is coupled to encoder 609 in the busy mode. The encoder encodes its input and outputs the I and Q symbol components corresponding to each scrambled 5-bit pattern.

In the idle mode, there is no information on bus 601 and selector couples reference signals, designated as quadrant selection bits, on bus 605 to scrambler 602. In the idle mode, only 2 bits are presented to the scrambler at any time and these bits are scrambled and coupled to the encoder. During the idle mode, encoder 609 provides the idle symbols. These idle symbols are determined by the scrambled 2-bit output provided by scrambler 602. Since this output is scrambled, the quadrant selection bits can be either a single fixed pair of bits or can be a pair of bits selected at random from a set of 4 different pairs of bits.

The state of the transmit enable signal on lead 606 controls the operation of selector 604, counter 607 and encoder 609. At the idle-to-busy mode transition, the counter counts output bit patterns representative of the predetermined number of outermost symbols for each such transition. The 5 bits representative of each outermost symbol are scrambled via scrambler 602 and then encoded into its I and Q components by encoder 609.

It should, of course, be noted that while the present invention has been described in terms of an illustrative embodiment, other arrangements will be apparent to those of ordinary skill in the art. For example, while the present invention has been described with reference to a particular signal constellation having a rectilinear shape, the present invention is not limited to a particular constellation or particular constellation shape. For example, the present invention can be applied to constellations which have a circular or oval shape. Or, for example, the present invention can be applied to constellations having at least one outermost symbol and all or a subset of such symbols can be utilized as described hereinabove. Finally, while the disclosed embodiment has been described in reference to an embodiment which utilizes discrete devices, these devices can be implemented using one or more appropriately programmed, general-purpose processors, or special-purpose integrated circuits, or digital processors or an analog or hybrid counterpart of any of these devices.

We claim:

1. Apparatus for use in a communications system utilizing first and second modes wherein in said first mode information represented by symbols in a signal constellation is transmitted and in said second mode said information is not transmitted, said apparatus comprising means for receiving data; and
   means responsive to data received by the means for receiving data and a control signal for generating first symbols representative of said received data, said first symbols being in a first portion of said signal constellation; and for generating at least one second symbol representative of a selected one of said first and second modes, said second symbol being in a second portion of said signal constellation, and said second symbol not being used to represent said received data.

2. The apparatus of claim 1 wherein said selected one of said first and second modes is said second mode.

3. The apparatus of claim 1 wherein said apparatus also receives a first symbol and a second symbol from a full duplex communications link and said generating means couples said second symbol to said full duplex link at times corresponding to first symbols being received from said full duplex communications link.

4. The apparatus of claim 1 wherein said second symbol is one of the innermost symbols in said signal constellation.

5. The apparatus of claim 1 wherein said first symbols are transmitted in successive packets which are separated from one another and each packet includes a portion indicating a transition from said second mode to said first mode.

6. The apparatus of claim 5 wherein said packet portion includes at least one outermost symbol in said symbol constellation.

7. The apparatus of claim 6 wherein said outermost symbol is used to represent data as well as indicate a change from said second mode to said first mode.

8. The apparatus of claim 6 wherein said packet portion also includes at least one symbol other than an outermost symbol.

9. The apparatus of claim 5 wherein said packet portion is at the beginning of each packet.

10. Apparatus for use in a communications system utilizing first and second modes, said apparatus comprising
means for receiving first symbols and at least one second symbol from said communications channel, said first and second symbols lying in a signal constellation and said second symbol being different from any of said first symbols; and
means responsive to the received first and second symbols for decoding said first symbols into an associated plurality of bits and for detecting a selected one of said first and second modes in response to said second symbol;
wherein, in said first mode, information represented by symbols in the signal constellation is transmitted and in said second mode said information is not transmitted.

11. The apparatus of claim 10 further including means for generating said first symbols in response to data bits and transmitting these symbols through said communications channel and wherein said first symbols are transmitted in time intervals, each interval being associated with said second symbol received by said receiving means from said communications channel.

12. The apparatus of claim 10 further including means for generating said second symbol and transmitting said second symbol through said communications channel and wherein said second symbol is transmitted in time intervals, each time interval being associated with a receipt of at least one of said first symbols from said communications channel.

13. The apparatus of claim 10 wherein said second symbol is A an innermost symbol in said signal constellation.

14. The apparatus of claim 10 wherein one of said first symbols is an outermost symbol in said signal constellation.

15. The apparatus of claim 14 wherein another one of said first symbols is a symbol other than said outermost symbol.

16. The apparatus of claim 14 wherein said decoding means decodes each of said first symbols which is said outermost symbol in an associated plurality of bits at certain times and does not decode said first symbol which is said outermost symbol at other times.

17. A method for use in a communications system utilizing first and second modes wherein, in said first mode, information represented by symbols in a signal constellation is transmitted and in said second mode said information is not transmitted, said method comprising the steps of
receiving data;
generating first symbols representative of said received data in response to a control signal, said first symbols being in a first portion of said signal constellation; and
generating at least one second symbol representative of a selected one of said first and second modes, said second symbol being in a second portion of said signal constellation, and said second symbol not being used to represent said data.

18. A method for use in a communications system utilizing first and second modes, said method comprising the steps of
receiving first symbols and at least one second symbol from said communications channel, said first and second symbols lying in a signal constellation and said second symbol being different from any of said first symbols;
decoding said first symbols into an associated plurality of bits; and
detecting a selected one of said first and second symbol;
wherein, in said first mode, information represented by symbols in the signal constellation is transmitted and in said second mode said information is not transmitted.

* * * * *